May 6, 1930.  F. G. L. BOYER  1,757,072
ELECTRICAL CONTROLLING DEVICE
Filed March 16, 1922   3 Sheets-Sheet 1

INVENTOR.
Frederick G. L. Boyer,
BY F. K. Fassett,
ATTORNEY.

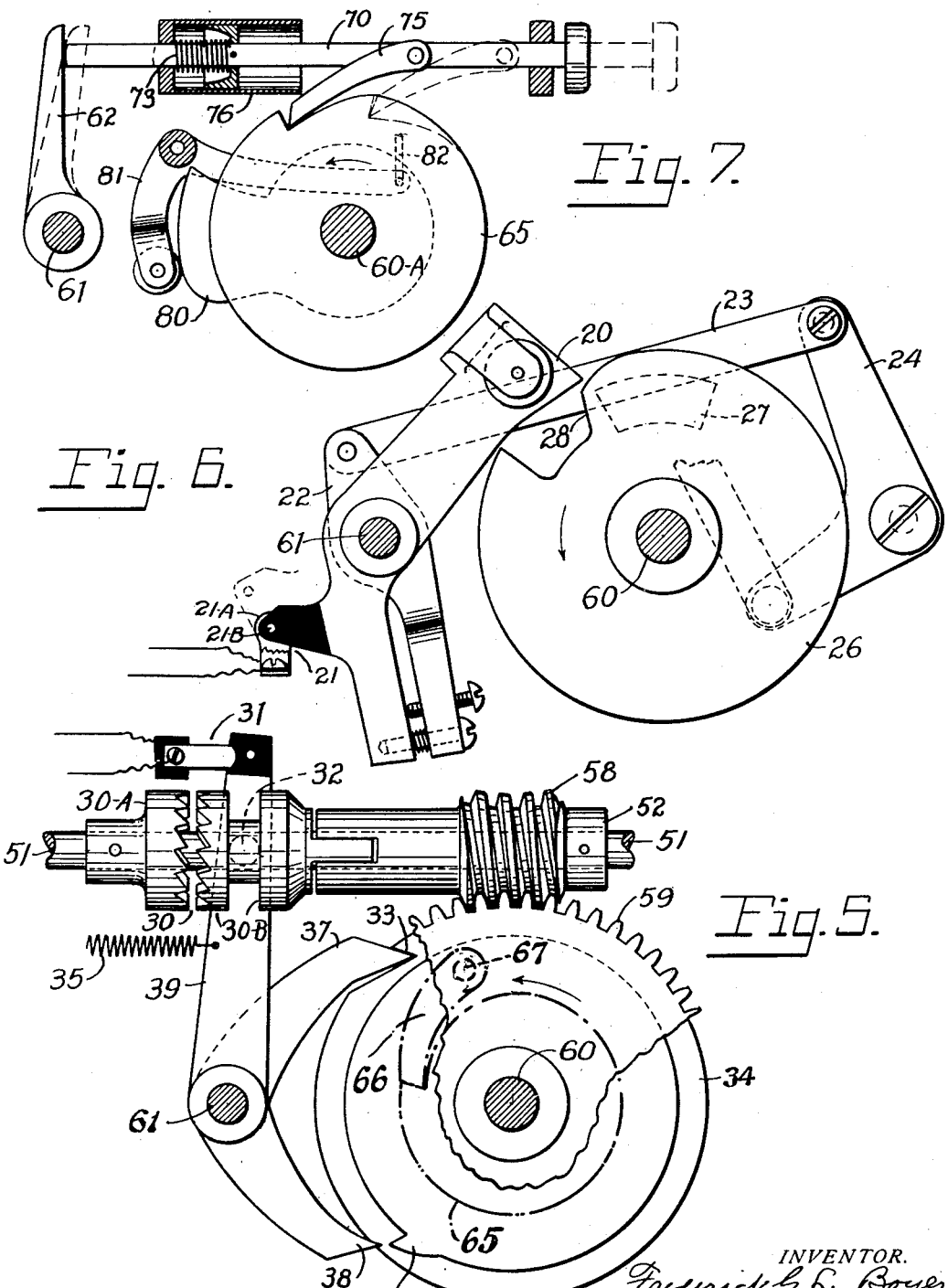

May 6, 1930. F. G. L. BOYER 1,757,072
ELECTRICAL CONTROLLING DEVICE
Filed March 16, 1922   3 Sheets-Sheet 3

INVENTOR.
Frederick G. L. Boyer,
BY F. K. Fassett,
ATTORNEY.

Patented May 6, 1930

1,757,072

UNITED STATES PATENT OFFICE

FREDERICK G. L. BOYER, OF DAYTON, OHIO, ASSIGNOR TO DAYTON SCALE COMPANY, OF DAYTON, OHIO, A CORPORATION OF NEW JERSEY

ELECTRICAL CONTROLLING DEVICE

Application filed March 16, 1922. Serial No. 544,126.

The present invention relates to an improvement in the device shown in the copending application of Boyer and Boyer, Serial Number 534,038, filed February 4, 1922. In said application is disclosed an automatic weighing scale and manually operated computing and recording mechanism connected thereto and controlled thereby, and means for preventing the operation of the computing mechanism when the scale is not in equilibrium.

The prime objects of the present invention are to provide electric in place of manual operation of the computing and recording mechanism, and to provide means whereby said electrical operation will likewise be prevented when the scale is not in equilibrium. Another object of the present invention is to provide means which will automatically set the computing mechanism in operation when the scale attains its condition of equilibrium under the applied load, if the price per unit of weight has already been properly set up. Other detailed objects of the invention will be made plain by reference to the accompanying specifications and claims.

In the drawings:

Fig. 5 shows the operating clutch and connections between the motor and the driving shaft of the computing and recording mechanism, and the method in which the clutch is thrown out and the power current shut off at the completion of the operation of the machine.

Fig. 6 shows how the price setting mechanism operates to prevent the closing of the circuit when it is out of adjustment, and also how the adjustment of the price setting mechanism serves to throw in the clutch and close the clutch-controlled contact.

Fig. 7 shows the push button device illustrated diagrammatically in Fig. 4, which is substituted for certain of the electric contacts in the arrangements illustrated diagrammatically in Figs. 1, 2, and 3. This view is a section taken on line 7—7 of Fig. 8, but with the omission of the supporting framework for the sake of clearness.

Like numerals designate like parts in all of the drawings.

Figure 1:
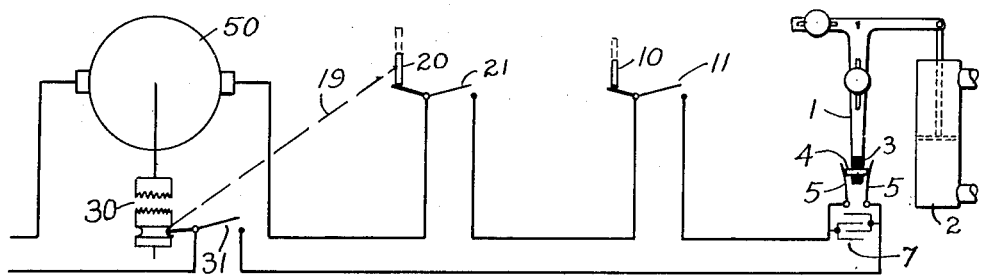
Fig. 1 is a wiring diagram showing the simplest arrangement of the wiring for our invention.

The mechanism illustrated in the drawings will be more readily understood if we first consider in detail the various functions required of the mechanism in order to attain the objects in view.

First, until the scale attains its condition of equilibrium the operating circuit must be kept open, and when the scale comes to equilibrium the circuit should be automatically closed. This is done by means of the dash pot device shown in the application above mentioned and more particularly described in my copending application S. N. 25,091. The piston in the secondary cylinder 2 (see Fig. 1) of this device is attached to the balanced lever 1, shown in application S. N. 534,038, which lever as there described is in its normal position when and only when the scale is in equilibrium. To this lever 1 is attached a block of insulation 3 shown in Figs. 1, 2, and 3. In this block of insulation is mounted a conductor 4 in such a manner that when lever 1 is in its normal position each end of conductor 4 is in contact with a light spring contact 5. These spring contacts are arranged to yield when the lever 1 is displaced by movement of the scale in either direction, but are so arranged as not to follow the motion of the lever 1. This means that a slight movement of lever 1 will move the conductor 4 away from one or the other of the spring contacts 5 and thus break the circuit. That is, the circuit will be broken whenever the scale is moving and will be automatically closed again when the scale comes to rest in a position of equilibrium.

In Fig. 1 it will be seen that the arm of lever 1 which carries conductor 4 is much longer than the arm to which the piston in cylinder 2 is attached, thus making the motion of conductor 4 much greater than that of the piston in cylinder 2. In application Serial No. 534,038 it will be observed that the secondary cylinder 2 is much smaller than the primary cylinder of the dash pot device, so that the motion of the piston in secondary cylinder 2 is much greater than that of the piston in the primary cylinder, which piston is attached to the scale. Thus it is that the motion of conductor 4 is very much greater than the motion of the scale, the motion of the scale being magnified by each of two devices, so that an extremely small motion of the scale suffices to break the circuit. The amount of motion of the scale necessary to break the circuit can be regulated to be as great or as small as desired by the relative diameters of the two cylinders, and the relative lengths of the arms of lever 1 and by the positioning of the counterweights in lever 1, as described in the application referred to, and in my Patent No. 1,449,162, March 20, 1923. In practice the proportions of these parts are made such that the degree of motion of the scale necessary to break the circuit is somewhat less than the degree of motion necessary to effect a change in the reading in the smallest units adapted to be determined by the particular scale. A less degree of motion is of no consequence and may therefore be considered equilibrium. The terms motion and equilibrium of the scale as used in these specifications and claims are to be understood as meaning the degree of motion described, or the lack of that degree of motion.

Second, if this were the only control serving to make the connections and start the motor 50 operating the computing mechanism, the computing mechanism would operate again when the load had been removed and the scale had returned to its zero position. I therefore provide another control which prevents the closing of the operating circuit while the scale itself is in its zero position. This consists of a switch 11, shown diagrammatically in Figs. 1, 2, and 3 operated by a movable part 10 of the scale in a manner exactly similar to those switches which turn on an electric light in certain well known types of computing scales when there is a weight placed on the scale. In this case the function of this switch is exactly the same, it makes the connection when the scale leaves its zero position and breaks the connection again when the scale returns to zero, and therefore it need not be further described.

Third, reference to the application S. N. 534,038 will show that, not only must the scale be in proper position before the computing operation takes place, but that the price-per-unit-of-weight setting devices must be properly set. If the price setting devices are not properly set a lever 20 is out of its normal position and we simply make it, when so displaced, hold open another switch 21, illustrated in the diagrams Figs. 1, 2, and 3, and hereinafter more fully described. This makes impossible the establishment of the operating electric connections except when the price setting mechanism is properly located in one of its prepared positions.

When these three conditions are fulfilled the mechanism may be permitted to operate. When the operation is completed we must provide for stopping the motor 50. By means of mechanism which will be described later a clutch 30, shown diagrammatically in Figs. 1, 2, 3, and 4, between the motor and the mechanism operated thereby, is thrown out, and at the same time the circuit is broken by another switch 31 also shown in Figs. 1, 2, 3, and 4. To prevent another operation beginning immediately, before any of the three conditions prerequisite to the operation of the device have been disturbed, this switch 31 is held open until it is again closed and clutch 30 reengaged by the manually controlled operation of the lever 20. The connection between these elements and lever 20 will be fully described later and is indictaed in the diagrams Figs. 1, 2, and 3 by means of a line 19 connecting clutch 30 and lever 20.

We may now examine the operation of the device. First the price setting mechanism (not shown) is adjusted to the desired price per pound. This throws in clutch 30 and closes switches 31 and 21. Then the article to be weighed is placed on the scale, (not shown). When the scale leaves its zero position switch 11 is automatically closed, and at the same time the motion of the scale displaces lever 1 by the action of the fluid in the secondary cylinder 2 of the dash pot attached to the scale (see Fig. 1) thus breaking the contact between spring contacts 5 which was made by conductor 4. This is now the only contact which remains open and prevents the operation of the mechanism. As soon as the scale attains its condition of equilibrium, lever 1 returns to its normal position and establishes this last contact, starting motor 50 and operation of the mechanism. At the completion of the operation clutch 30 is thrown out and the mechanism is brought to an immediate stop, and switch 31 is opened stopping the motor. At this time switch 31 is the only contact which is open. When the load is removed from the scale contact between springs 5 is temporarily broken until the scale has attained equilibrium at zero and opened switch 11. This is then the normal condition— switches 11 and 31 open and all others closed. It obviously makes no difference whether the operator operates the price setting devices, closing switches 31 and 21 (which latter is open only during the setting of the price as will be hereafter described) before placing the load on the scale, as above described, or after placing the load on the scale has closed contacts 5 and 11, or after placing the load on the scale has closed contact 11 and while waiting for the scale to reach equilibrium and close contact 5. In whatever order the contacts are closed the operation of the device starts when, and not until, all of the contacts 5, 11, 21, and 31 are closed.

A condenser, similar to that shown at 7 in Fig. 1, may be used wherever desired to prevent sparking at the contacts.

Figure 2:
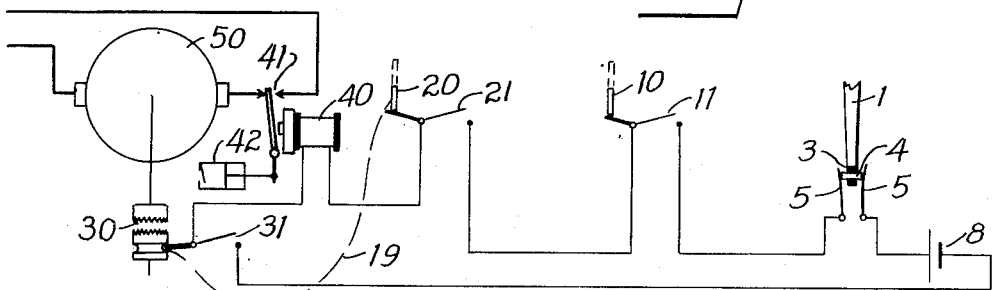
Fig. 2 is a wiring diagram showing the use of a secondary control circuit to remove various delicate contacts from the power circuit.

The contacts 5 are rather delicate for the direct control of a power circuit and so we may place them on a secondary or control circuit. In Fig. 2 all four of the above described contacts are shown on such a secondary circuit, current for which may be furnished by a battery 8 or any other suitable source. A relay 40 in this secondary circuit closes the single contact 41 in the operating circuit when all of the contacts 5, 11, 21, and 31 are closed, and causes operation of the device in exactly the same manner as where all contacts are on the power circuit as above described. It should be noted that the action of relay 40 in closing the circuit is retarded, by any suitable means such as a simple one-way dash pot shown at 42 in Fig. 2, so that as lever 1 swings from side to side the current established in the secondary circuit for the instant it is passing through its normal position will not be of sufficient duration to close the contact 41, and that the action in breaking the circuit at 41 is not so retarded but takes place instantly as soon as the secondary circuit is broken.

Figure 3:
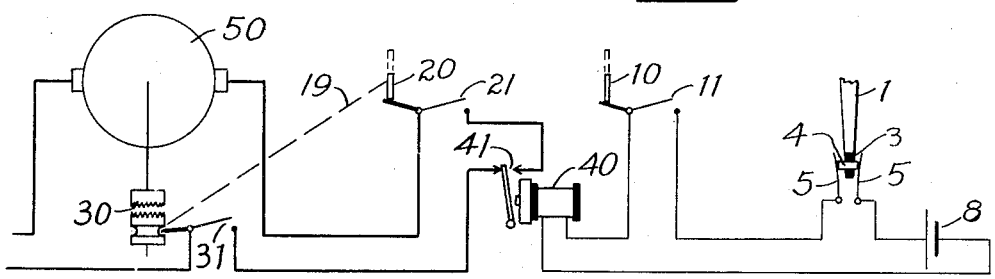
Fig. 3 is a wiring diagram showing part of the contacts on the power circuit and part of the contacts on the secondary circuit.

It will be apparent that as many or as few of the various contacts used as desired may be placed on the secondary circuit and the others on the operating circuit, without in any way changing the operation as above described, when all of the contacts were placed directly in the power circuit. In Fig. 3 only two of them are shown on the secondary circuit 7 the two most delicate contacts 5, and 11, i. e. those made by the dash pot and the scale itself.

The method of making the contacts at 5 and 11 has already been sufficiently described, and now by reference to Figs. 5 and 6 we can see the mechanism by which the contacts at 21 and 31 are controlled.

Referring first to Fig. 6 which shows the method of making contact 21, we find the connected levers 20 and 22 mounted to rock on shaft 61 just as shown in application S. N. 534,038. As in the application referred to, these levers are connected by connecting rod 23 to bell crank levers 24, which is rocked in a clockwise direction whenever the price setting mechanism is being adjusted, and does not return to the normal position shown in Fig. 6 until the price setting mechanism is properly located in one of the prepared price positions. Thus when the price is being adjusted, or if the mechanism is left without proper adjustment, the point of lever 20 will be in the path of block 27 on cam 26 which is mounted on the cam shaft 60 of the computing mechanism, thus preventing operation of the mechanism. In order to prevent the making of the operating contact for the motor in such cases it is merely necessary to have a switch which will be open when lever 20 is in a position to block the operation of the device, and will be closed when lever 20 returns to its normal position, such as is illustrated in a simple form at 21 in Fig. 6, in which a connection is formed between two spring contact members 21A, one of which is broken away, in the figure, by means of a conductor 21B mounted in a block of insulation attached to lever 20 in such a manner that when the price setting mechanism is out of adjustment the conductor 21B is moved away from between the contacts to a position indicated by dotted lines, and the circuit is broken by the block of insulation which is then interposed between the contact members 21A.

In Fig. 5 is illustrated the switch 31 and the clutch 30 and driving connections between the motor and the cam shaft of the machine. The motor 50 shown in the diagrams is connected to shaft 51 either directly or by means of intermediate gearing. Rigidly attached to shaft 51 is the member 30A of clutch 30. Also rigidly attached to this same shaft 51 is thrust collar 52 which takes the end thrust on worm 58, which turns shaft 60 by means of worm gear 59 attached thereto, during the operation of the device. Member 30B of clutch 30 and worm 58 are both loosely mounted on shaft 51 and are keyed together so that when clutch 30 is engaged worm 58 will turn with shaft 51, and when clutch 30 is disengaged the shaft 51 will turn freely within member 30B and worm 58. The engagement and disengagement of clutch 30 is controlled by a roller 32 attached to arm 39.

In Fig. 5 is also illustrated the cam 36 which at the completion of an operation throws out arm 38 and thereby throws arm 37, which is rigidly attached thereto, into notch 33 in cam 34 and thus stops the operation, just as shown in application S. N.

534,038. To the arms 37 and 38 I have rigidly attached the arm 39 which, as arm 37 enters notch 33, throws out clutch 30 by means of roller 32 and opens switch 31, which is similar to switch 21 already described. The motor is now free from the machine and the current is turned off so that the motor can come to a stop without shock. The mechanism itself is stopped at the proper point by arm 37 entering notch 33. It will be noticed that the notch 33 is undercut so that it will hold arm 37 against the action of spring 35 and thus hold contact 31 open and clutch 30 out of engagement in order to prevent the repeated operation of the machine while all other conditions are right. Thus before the next operation can take place it is necessary to release arm 37 from notch 33. As here illustrated this is done by the price setting operation as may be seen in Fig. 6. As arm 20 is rocked by the price setting operation the roller thereon is brought into contact with the cam-shaped side 28 of the notch in cam 26, which is provided for this purpose, and cam shaft 60 is thereby rotated, in a direction opposite to the direction of operation indicated by the arrow, an amount sufficient to release arm 37 and allow spring 35 to engage clutch 30 and close contact 31. (See also Fig. 5.) To allow this reverse rotation of shaft 60 the worm 58 is made of sufficient angle to prevent locking.

The modification illustrated diagrammatically in Fig. 4 and more particularly in Figs. 7, 8, and 9 will now be described. As may be seen from Fig. 4 the clutch 30 and switch 31 are retained in this modification, which thus includes all of the mechanism illustrated in Fig. 5.

In this modification the electric contacts at 5, 11, and 21 are discarded, only the single contact 31 controlled with the clutch 30 is retained. For the dash pot control of contacts 5 is substituted the mechanical dash pot control just as described in application S. N. 534,038. This is illustrated diagrammatically in Fig. 4 by teeth 71, shown for illustrative purposes, as on push button rod 70 which must pass through the aperture in lever 1 before the operating contact can be made, and which can only pass through that aperture when the scale is in equilibrium and lever 1 in its normal position. Lever 1 is the same as that shown in Fig. 1 connected to secondary cylinder 2 of the dash pot described in the applications referred to.

The contact 11 controlled by the scale is not needed in this modification because it is not necessary to prevent operation when the scale is at zero.

Figure 4:
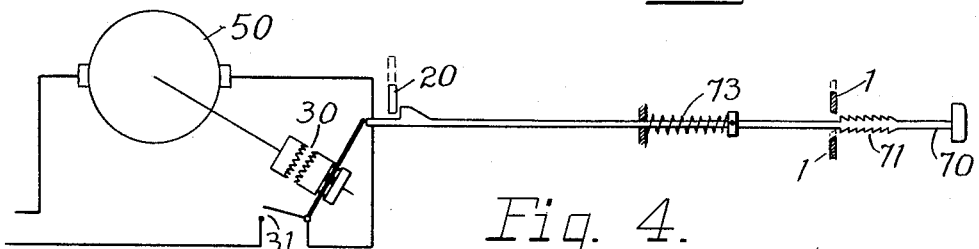
Fig. 4 is a wiring diagram showing a manual control in the form of a push button with mechanical controls in the place of the delicate electric contacts shown in the preceding three figures.

The method by which the operation is prevented when the price is not adjusted is indicated diagrammatically in Fig. 4 by showing lever 20 in a position to block the movement of push button 70, its position when the price setting mechanism is out of adjustment. Push button 70 is also indicated as adapted to positively engage clutch 30 and close switch 31, as will presently appear.

Figure 8:
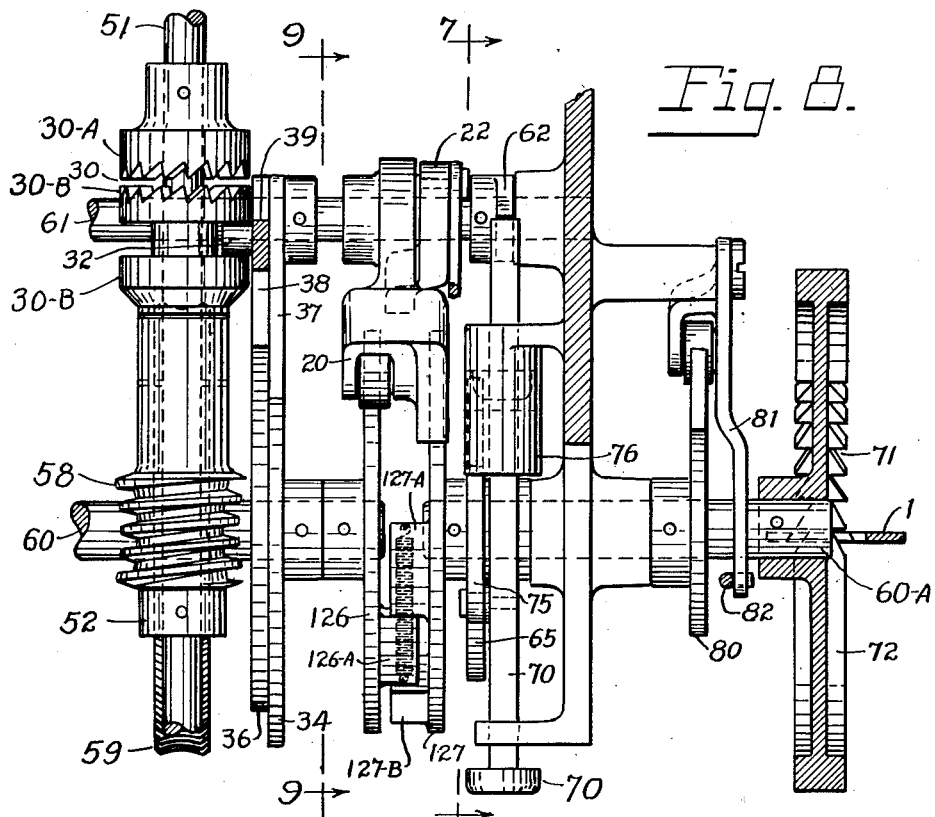
Fig. 8 is a plan view of a portion of the cam shaft of the computing machine showing in detail how the various controls are applied to the push button, and showing in plan the parts shown in Figs. 5 and 9.

In Fig. 8 it will be seen that the cam shaft 60 of the computing mechanism has been cut in two, leaving its right hand end 60A free to move separately under certain restrictions which will be described later. This detached end 60A carries the following three elements described in the application S. N. 534,038: disc 72 carrying teeth 71 which serve to prevent the rotation of the shaft 60A when motion of the scale displaces lever 1 from its normal position; cam 80 which, acting through lever 81 and connecting rod 82 (see also Fig. 7), serves to lock the scale in its position of equilibrium as soon as notches 71 have passed lever 1; notched cam 127 which takes the place of block 27 on the side of disc 26 as shown in Fig. 6. In addition to these three old elements shaft 60A carries a disc 65 (Figs. 7 and 8) with a suitable notch therein by means of which pawl 75 attached to push button 70 rotates shaft 60A through an angle sufficient to bring all of the notches 71 past lever 1 and to lock the scale in its position of equilibrium. In Fig. 7 push button 70 is shown in this fully depressed position, the normal position being shown in dotted lines.

The connection between shaft 60 and shaft 60A will now be described. Cam 126, taking the place of cam 26 shown in Fig. 6, which cooperates with the roller on arm 20 is attached to the end of shaft 60, and disc 127 is attached to the end of shaft 60A adjacent to cam 126. Attached to cam 126 is a block 126A, (see also Fig. 9) and attached to disc 127 are blocks 127A and 127B. These blocks are so positioned that when the mechanism is in its normal position blocks 126A and 127A are in contact and held so by means of spring 128, so that if shaft 60 is rotated in the direction indicated by the arrow, which is the direction of operation of the machine, it will carry shaft 60A with it, but that if shaft 60A is rotated in the same direction it can, by extending spring 128, rotate and leave shaft 60 undisturbed, held in position by arm 37 in notch 33, until notches 71 have passed lever 1 and cam 80 has caused the locking of the scale, before the relative movement of the two shafts is arrested by block 127B coming into contact with block 126A.

It should now be noticed that shaft 60A contains the controlling elements disc 72 and disc 127 which correspond to contacts 5, and 21 in Figs. 1, 2, and 3, and which represent all of the conditions which must be fulfilled before the mechanism dare be operated. Therefore if it is possible to rotate shaft 60A by means of push button 70, to the position described, the operating circuit may then be made.

To operate the machine we therefore proceed as follows: Placing the load on the scale we wait until it finds its position of eqilibrium, when lever 1 will come to its normal position, and then press push button 70. By means of the pawl 75 it rotates shaft 60A until all of the notches 71 are past the lever 1 and the scale is locked, at which point push button 70 strikes arm 62 (see Fig. 7), which is rigidly attached to shaft 61, and thereby rocks shaft 61 and arms 37, 38, and 39 which are also rigidly attached thereto, forcing arm 37 out of notch 33 and throwing in clutch 30 and switch 31 and thus starting the operation of the machine. (See also Fig. 5.) As the main shaft 60 rotates it picks up shaft 60A by means of block 126A contacting with block 127A, and carries it around to the completion of the cycle. On the completion of the operation clutch 30 and switch 31 are thrown out as already described in connection with Fig. 5 and are held out until push button 70 is again depressed.

In case the operator attempts to push button 70 and start the machine before the scale has attained its condition of equilibrium the motion of disc 72 will be blocked by lever 1 obstructing the path of one of the teeth 71, thus preventing the movement of shaft 60A and push button 70, just as described in the two applications referred to. In order to prevent a quick pressure on the push button 70 at the instant lever 1 is in its mid position while swinging from side to side, a simple air dash pot 76 may be provided to compel sufficient slowness of movement of the push button to insure the prevention of the operation except when the scale is in equilibrium.

Figure 9:
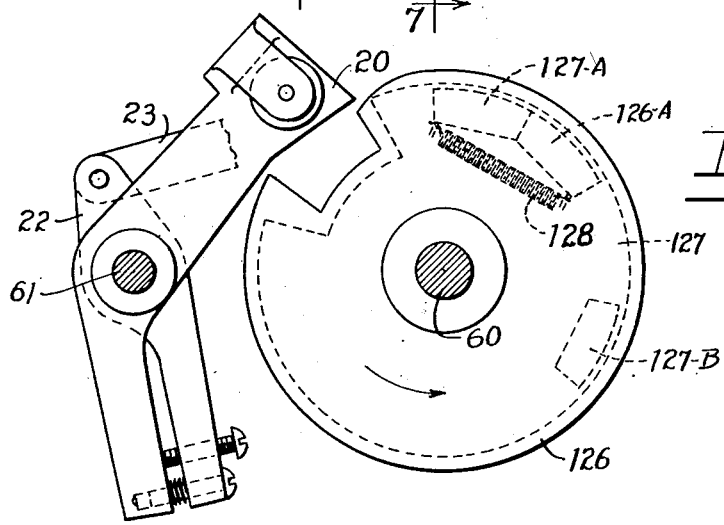
Fig. 9 is an end view of the cams and arms constituting the inter-control between the push button, the price setting mechanism, and the cam shaft of the computing machine. This view is a section taken on line 9—9 of Fig. 8.

The method by which the starting of the machine by push button 70 is prevented in case the price setting mechanism is not properly located in one of its prepared positions is shown in Fig. 9. When the price setting mechanism is not so located lever 20 is depressed into the path of the face of the notch in disc 127 thus preventing the rotation of shaft 60A by means of the push button.

A spring 73 returns the push button to its normal position as soon as it is released, and in case it has not been pushed far enough to lock the scale and start the motor the spring 128 will also return shaft 60A to its normal position. After shaft 60A has been turned far enough to lock the scale the locking cam 80 will prevent the backward movement under the influence of spring 128.

It will be noted that in this case it is not necessary to operate the price setting device unless it is desired to change the price for which the computing mechanism is set, as the price setting device has no control over the operation except when the setting process is incomplete. Thus with this arrangement an extra manual operation is only required when it is desired to change the price setting of the device.

It may also be observed that these devices for the electric control and operation of the computing mechanism do not prevent manual operation in case of failure of the source of power on any occasion. It need only be noted that the electric contacts made by dash pot lever 1 are supplied in addition to and not instead of the mechanical control which is illustrated in Fig. 8. And if the angle of the thread on the driving worm 58 located between the clutch and the cam shaft of the computing mechanism is not sufficient to allow it to be turned readily by the worm gear 59, it is only necessary to connect the worm gear 59 to the cam shaft 60 by a ratchet connection so that the shaft may be turned leaving the gear stationary. Such a construction is indicated by the broken lines in Fig. 5 where a single tooth ratchet wheel 65 is secured to the shaft 60 and a pawl 66 mounted on stud 67 fixed in worm gear 59 which is, in this case, loosely mounted on shaft 60. This will cause the gear 59 to operate the shaft 60 whenever it is turned by the worm 58. If, however, the shaft 60 should be operated manually the worm gear 59 may remain stationary, and when the operation of shaft 60 is complete the pawl and ratchet will again be in the position shown in the figure. If for any reason the manual operation of the machine, i. e., the shaft 60 should be incomplete the electrical mechanism would, if operated, merely complete the rotation of shaft 60 by pawl 66 entering the notch in the wheel 65 at the proper point in the operation.

In the case of the push button arrangement it is only necessary to observe that when the machine is operated by turning shaft 60, shaft 60A is carried with shaft 60 exactly as though it were the single shaft used in the manually operated device shown in application S. N. 534,038, and the operation in this case will be exactly the same as that there described.

During the use of the machine as an electrically operated device the handle may be arranged so that it may be entirely removed and replaced if manual operation becomes necessary, or it may remain attached and by means of a ratchet connection to the machine be permitted to remain stationary when the machine is operated by the motor.

The electric contacts and switches have all been shown diagrammatically or in their simplest forms, as there are many types well known in the art which may be applied to the devices herein described. Any of many well known types of clutches may be substituted for the one herein illustrated, and many other variations in the mechanical structures shown can also be made by those skilled in the art within the scope of the present invention. Although I have shown it as applied to a computing and recording mechanism attached to an automatic scale the same invention could be quite as readily applied to any other form of mechanism attached to such a scale, or it may also be attached to some form of device other than a scale which must control the attached electrically operated device in accordance with its own state of rest or motion.

These and many other changes may be made by those skilled in the art within the scope of the present invention and the appended claims.

What I claim is:

1. In an automatic scale: electrically operated mechanism a controlling circuit therefor; and means, automatically operating controlled by moving parts of the scale, for preventing closing of the operating circuit until a load has been placed upon the scale and the scale has attained a condition of equilibrium.

2. In an automatic scale: a manually operated price-setting device, electrically operated mechanism a controlling circuit therefor; and means, controlled by said setting device, for preventing the closing of the operating circuit until the operation of said setting device is complete.

3. In an automatic scale: a manually operated setting device; electrically operated mechanism and operating circuit therefor; and means, controlled by said setting device and moving parts of the scale, for preventing the closing of the operating circuit until the operation of said setting device is complete and the scale has attained its position of equilibrium.

4. In an automatic scale: a manually operated setting device; electrically operated mechanism a controlling circuit therefor; and means, controlled by said setting device and moving parts of the scale, for preventing the closing of the operating circuit until the operation of said setting device is complete, a load has been placed upon the scale, and the scale has attained its position of equilibrium.

5. In an automatic scale: a manually operated setting device; electrically operated mechanism a controlling circuit therefor; and means, controlled by said setting device and moving parts of the scale, for closing the operating circuit after the operation of said setting device has been performed, and the scale has attained its position of equilibrium.

6. In an automatic scale: a manually operated setting device; electrically operated mechanism a controlling circuit therefor; and means, controlled by said setting device and moving parts of the scale, for closing the operating circuit after the operation of said setting device has been performed, a load has been placed on the scale, and the condition of equilibrium attained.

7. In an automatic scale: a manually operated setting device; electrically operated mechanism a controlling circuit therefor; and means, controlled by said setting device and moving parts of the scale, whereby, when the setting operation has been completed, and a load placed on the scale, the attainment of equilibrium by the scale automatically closes the operating circuit.

8. In an automatic scale: electrically operated mechanism a controlling circuit therefor; a manually controlled switch for the operating circuit; scale controlled contacts in the operating circuit; and means for causing the closing of the operating circuit when the said manually controlled switch has been closed and the scale has attained its position of equilibrium.

9. In an automatic scale: electrically operated mechanism; means, controlled by moving parts of the scale, for causing said mechanism to operate only after the scale attains its position of equilibrium; and means for stopping its operation after it completes one operation.

10. In an automatic scale: electrically operated mechanism; means, controlled by moving parts of the scale, for causing said mechanism to operate when the scale attains its position of equilibrium; and means for stopping its operation and breaking the operating circuit after it completes one operation.

11. In an automatic scale: electrically operated mechanism, which should be permitted to operate only when the scale is in equilibrium; and fluid-controlled means, controlled by moving parts of the scale, for closing an operating contact when the scale attains a condition of equilibrium; and means for opening an operating contact when said electrically operated mechanism completes one operation.

12. In an automatic scale: electrically operated mechanism a controlling circuit therefor; means, controlled by moving parts of the scale, for closing the operating circuit only after the scale attains its position of equilibrium; and means for breaking the operating circuit when said mechanism completes one operation.

13. In an automatic scale: electrically operated mechanism; means, controlled by moving parts of the scale, for preventing operation of said mechanism until the scale attains its position of equilibrium; means for stopping its operation when it completes one operation; and means for preventing another operation thereof until a manual operation has been performed.

14. In an automatic scale: electrically operated mechanism a controlling circuit therefor; means, controlled by moving parts of the scale, for preventing the closing of the operating circuit until the scale is in its position of equilibrium; means for breaking the operating circuit after one operation is completed; and means for then holding the operating circuit open until a manual operation has been performed.

15. In an automatic scale: electrically operated mechanism, a controlling circuit therefor; means, controlled by moving parts of the scale, for holding open the operating circuit while the scale is at zero and until it comes to its position of equilibrium under an applied load; means for breaking the circuit when said electrically operated mechanism completes one operation; and means for then holding open the operating circuit until a manual operation has been performed.

16. In an automatic scale: electrically operated mechanism, a controlling circuit therefor; means, controlled by moving parts of the scale, for holding open the operating circuit while the scale is at zero and until it comes to its position of equilibrium under an applied load; and means for breaking the circuit when said electrically operated mechanism completes one operation.

17. In an automatic scale: electrically operated mechanism, a controlling circuit therefor; manually controlled means for closing the operating circuit; a manually operated setting device; and means, controlled by said setting device and moving parts of the scale, for preventing the operation of said circuit closing means while the operation of said setting device is incomplete, or the scale mechanism is in motion.

18. In an automatic scale: a manually operated setting device; electrically operated mechanism, a controlling circuit therefor; manually operated means for closing the operating circuit; and means, controlled by said setting device, for preventing the operation of said circuit closing means when the manual setting operation is incomplete.

19. In an automatic scale: a manually operated setting device; electrically operated mechanism, a controlling circuit therefor; manually operated means for closing the operating circuit; means, controlled by said setting device, for preventing the operation of said circuit closing means while the manual setting operation is incomplete; and means, controlled by moving parts of the scale for preventing the operation of said circuit closing means when the scale is not in equilibrium.

20. In an automatic scale: electrically operated mechanism, a controlling circuit therefor; manually operated means for locking the scale and closing the operating circuit; and means, controlled by moving parts of the scale, for preventing the operation of said manually operated means when the scale is not in equilibrium.

21. In an automatic scale: electrically operated mechanism, a controlling circuit therefor; manually operated means for closing the operating circuit; and means, controlled by moving parts of the scale, for preventing the operation of said manually operated means when the scale is not in equilibrium.

22. In a power driven apparatus for use with a weighing scale, the combination comprising a continually active source of power, means adapted to be driven by said source of power, means for automatically connecting said means to said source of power when the weighing scale is in equilibrium, and means for automatically discontinuing the connection when said first named means has completed an operation.

23. A weighing scale including parts movable to positions of equilibrium in response to weighing operations and electrically controlled mechanism for registering a function of the position thereof, a control circuit for said mechanism, means controlled by the movable scale parts for energizing said circuit when the parts reach a position of equilibrium after a weighing operation and means for automatically preventing energization of said circuit in the absence of a weighing operation to preclude idle operations of the registering mechanism.

24. A weighing scale including mechanically operable load counterbalancing mechanism having parts movable to positions of equilibrium in response to weighing operations, auxiliary electrically controlled mechanism adapted to be controlled by the counterbalancing mechanism when it reaches a position of equilibrium, a control circuit for said electrically controlled mechanism, means for energizing said circuit when the load counterbalancing mechanism reaches a condition of equilibrium after a weighing operation and means for automatically preventing energization of said circuit in the absence of a weighing operation to preclude idle operations of the auxiliary mechanism.

FREDERICK G. L. BOYER.